April 25, 1967 R. V. BENNETT 3,315,884

MECHANICAL MEMORY UNIT

Filed March 1, 1965

5 Sheets-Sheet 1

INVENTOR.
RALPH V. BENNETT

BY

John D. Wilkins
ATTORNEY

April 25, 1967 R. V. BENNETT 3,315,884

MECHANICAL MEMORY UNIT

Filed March 1, 1965 5 Sheets-Sheet 2

INVENTOR.
RALPH V. BENNETT

BY

John D. Wilkins
ATTORNEY

INVENTOR.
RALPH V. BENNETT
BY
John D. Wilkins
ATTORNEY

April 25, 1967 R. V. BENNETT 3,315,884

MECHANICAL MEMORY UNIT

Filed March 1, 1965 5 Sheets-Sheet 4

INVENTOR.
RALPH V. BENNETT

BY John D. Wilkins
ATTORNEY

April 25, 1967 R. V. BENNETT 3,315,884

MECHANICAL MEMORY UNIT

Filed March 1, 1965 5 Sheets-Sheet 5

INVENTOR.

RALPH V. BENNETT

BY

John D. Wilkins

ATTORNEY 3,315,884
MECHANICAL MEMORY UNIT

Ralph V. Bennett, Norwalk, Conn., assignor to Sperry Rand Corporation, New York, N.Y., a corporation of Delaware Filed Mar. 1, 1965, Ser. No. 435,928
4 Claims. (Cl. 235—60)

This invention relates to recall devices for machines and more particularly to mechanical memory units of the gear wheel type together with controls therefor useful for storing and recalling items in office machines.

Many office machines, such as calculators, computers, card readers, and the like, incorporate mechanical memory units in the form of a plurality of storage wheels adapted to be selectively rotated to positions indicative of a numerical value entered as an item into the machine, or stored in the conventional registers of the office machine, for retention and subsequent use in the operation of the machine. The incorporation of such memory units in office machines has however, in most instances, adversely affected the cost and efficiency of operation thereof due to the inclusion of considerable, expensive structure for proper control and operation of such memory units.

Most office machines currently available require what is commonly referred to as a differential mechanism to transmit the value entered into the machine from the entry mechanism thereof (keyboard, pinbox, card reader, etc.), to either one or more other mechanisms of the machine (registers, printers, etc.) between such other mechanisms, or from such other mechanisms back to the value entry mechanism. Said differential mechanism usually takes the form of racks either straight or curved having one or more sets of gear teeth formed in appropriate positions thereon. Operator actuation of an appropriate cycle initiating mechanism, or actuation thereof by another mechanism of the office machine, sets into motion the various instrumentalities of the machine and starts said differential mechanism racks moving from rest position, in a forward (value receiving) direction until such movement is arrested by either the value entry mechanism, by the register, or by other mechanisms provided with the office machine. The machine cycle then continues with the racks moving in a restoring, value entering direction back to their rest positions which movement usually coincides with or is shortly followed by termination of the machine cycle.

In many office machines the memory wheels of the memory unit are normally maintained out of engagement with the differential racks and in order to enter a value into such memory unit a positive action is called for on the part of the operator to initiate operation of appropriate structure to: (1) return the memory wheels to zero condition; (2) move the memory wheels into engagement with the racks (usually at mid-cycle); (3) maintain the memory wheels in engagement with the racks for a predetermined period (usually during the return movement thereof) to receive the value entered therein; (4) move the memory wheels back out of engagement with the racks; and (5) latch the memory wheels in their set positions to retain the value entered therein. Subsequent use of the value so entered into the memory unit also necessitates positive action to: (1) prevent return of the memory wheels to zero condition; (2) move the memory wheels into engagement with the racks (usually just prior to the forward movement thereof); (3) maintain the memory wheels in engagement with the racks for a predetermined period (during either both the forward and return movement of the racks if the value is to be reentered into the memory unit, or during only the forward movement of the racks if the value is not to be so reentered); (4) move the memory wheels back out of engagement with the racks; and (5) latch the memory wheels in their set positions. The control structure required for the hereinbefore described movements of the memory unit wheels or to maintain same against such movements, if complex and expensive, greatly adds to the manufacturing cost of the office machine as well as to the cost of servicing it. In addition the use of such prior memory units requires action on the part of the operator, otherwise the value which is to be entered into the memory unit will not be so entered.

Modern business practice dictates the use of office machines which provide for automatic entry into a memory unit of each value entered into the machine without further action on the part of the operator. Here again the gear wheels of the memory units, in most instances, are normally maintained out of engagement with the differential rack mechanism, and upon initiation of a machine operation (when the value in the memory unit is not to be used) the memory unit must first have the value just previously entered therein removed therefrom; must then have the gear wheels thereof moved into engagement with the differential rack mechanism (usually at the mid-cycle position thereof); maintained in engagement with the differential rack mechanism during the return movement thereof; moved out of engagement with the differential rack mechanism at the termination of said return movement; and latched against inadvertent upsetting of the value so entered thereon. When the value in the memory unit gear wheels is to be entered into the office machine, said value must not be removed therefrom; the memory unit must be moved into engagement with the differential rack mechanism (usually at the initiation of the forward movement thereof); must be maintained in engagement with the rack mechanism to control the extent of the movement thereof and, if desired, so as to again receive the value therefrom for subsequent use; must be returned out of engagement with said rack mechanism at the termination of the return movement thereof; and must be latched to prevent inadvertent upsetting of the entered value. If the value entered in the memory unit is not to be used, and is not to be disturbed, then the memory unit must be maintained out of engagement with the differential rack mechanism during both the forward and the return movements thereof. Heretofore, the control structure required for the hereinbefore described movements of the memory unit, or for maintenance of such memory unit in a position out of engagement with the differential rack mechanism, has been quite complex and expensive.

It is therefore an object of this invention to provide an improved memory unit for calculators.

Another object is to provide an office machine with an improved mechanical memory unit, of the gear wheel type, together with controls therefor to automatically receive each value entered into the office machine.

Yet another object is to provide an office machine with an improved memory unit, of the gear wheel type, and controls therefor to either render operation of the office machine dependent upon the value entered into the office machine in the just previous cycle so as to reenter same, or dependent upon a value entered into the office machine in any selected previous cycle to reenter same regardless of the values entered into the office machine after said selected previous cycle and before reentry thereof.

Still another object is to provide an offce machine with an improved mechanical memory unit, of the gear wheel type, and controls therefor requiring only a minimal number of movements for the various operations thereof and requiring only a minimal amount of structure to effect such operations.

A still further object is to provide an office machine with an improved mechanical memory unit, of the gear wheel type, and controls therefor utilizing substantial portions of existing machine structure to return the gear wheels of the memory unit to their zero positions.

This invention accordingly provides an office machine with a mechanical memory unit of the gear wheel type, and control structure therefor to normally maintain same in a position of engagement with the conventional differential rack mechanism of the office machine. The control structure, in response to initiation of a machine cycle following entry of a new value into the office machine, permits movement of the gear wheels of the memory unit out of said position of engagement with said differential rack mechanism and return thereof to a zero condition in response to movement of said conventional differential rack mechanism from a rest position to a value setting position, unless latched in engagement.

The control structure, furthermore, automatically moves said gear wheels of said memory unit into said position of engagement with said differential rack mechanism prior to return movement thereof to its rest position.

Operation of a recall key maintains the gear wheels of the memory unit in its normal position of engagement with said differential rack mechanism and renders operation of said differential rack mechanism and therefore of the office machine dependent upon the value entered into the memory unit during the just previous operation of the office machine without loss of said value from the memory unit. Operation of a storage key, on the other hand, not only maintains the gear wheels of the memory unit in engagement with said differential rack mechanism but also renders the zero stop structure for said memory unit inoperative to thereby permit unrestricted use of the office machine while still maintaining the value entered into the memory unit for any number of machine cycles, each value entered into the office machine during such cycles being first added to and then subtracted from said memory unit so that the value entered therein is not disturbed until said storage key is released.

The feautres and other objects and advantages of the invention will be understood from the following description of a preferred embodiment when considered with the drawing, in which.

For convenience, the invention will be described as applied to a memory unit adapted for incorporation in a calculator, it being understood nevertheless that without departing from the scope of the invention that subject memory unit can be incorporated in any type of office machine into which a value entered may advantageously be stored for use during a following cycle of the machine or for use during any preselected subsequent cycle of the machine.

Figure 1:
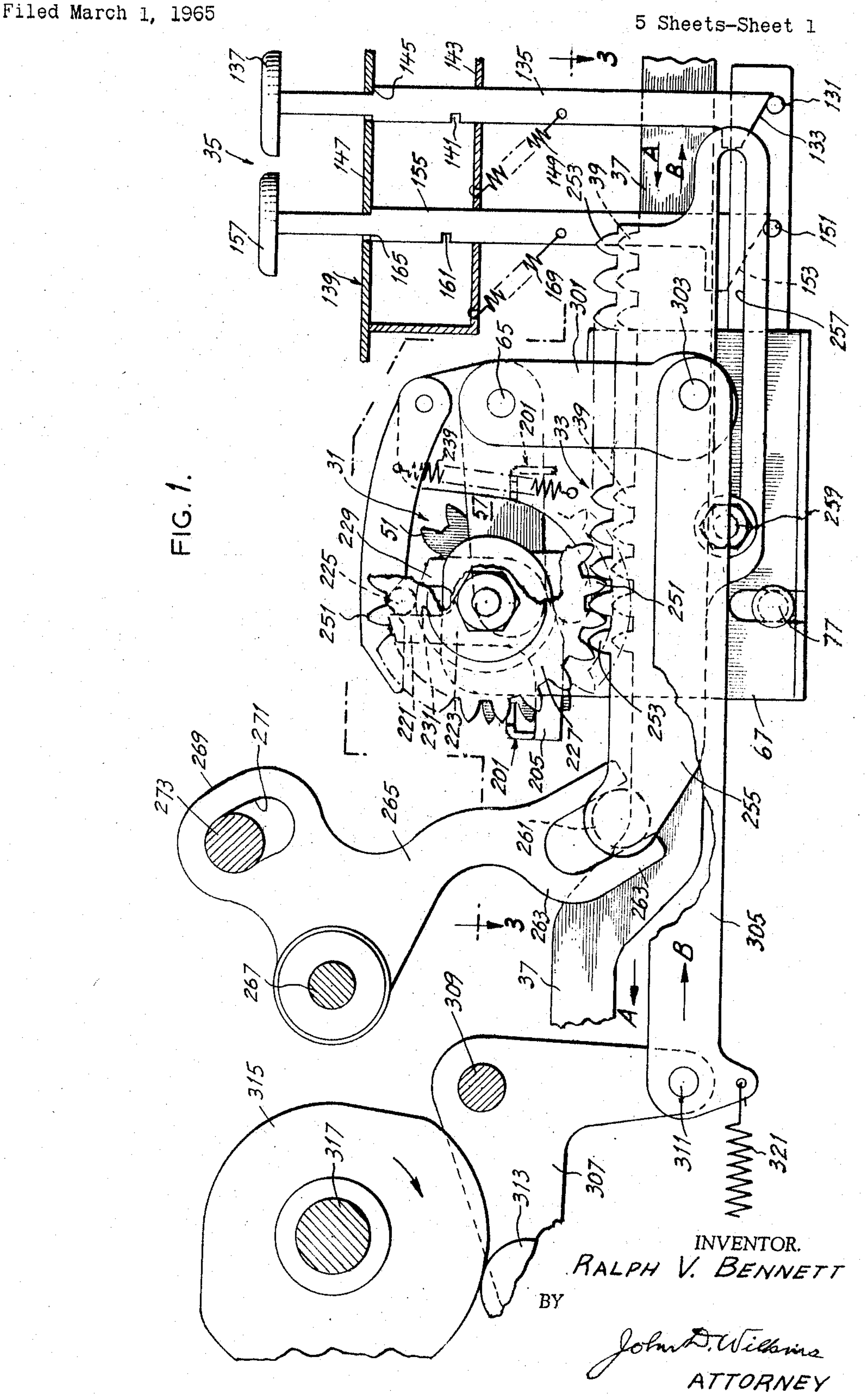
FIG. 1 is a left hand elevational view of part of an office machine, including one embodiment of the present invention, and showing the memory unit and differential racks in the normal or quiescent condition thereof.
Figure 2:
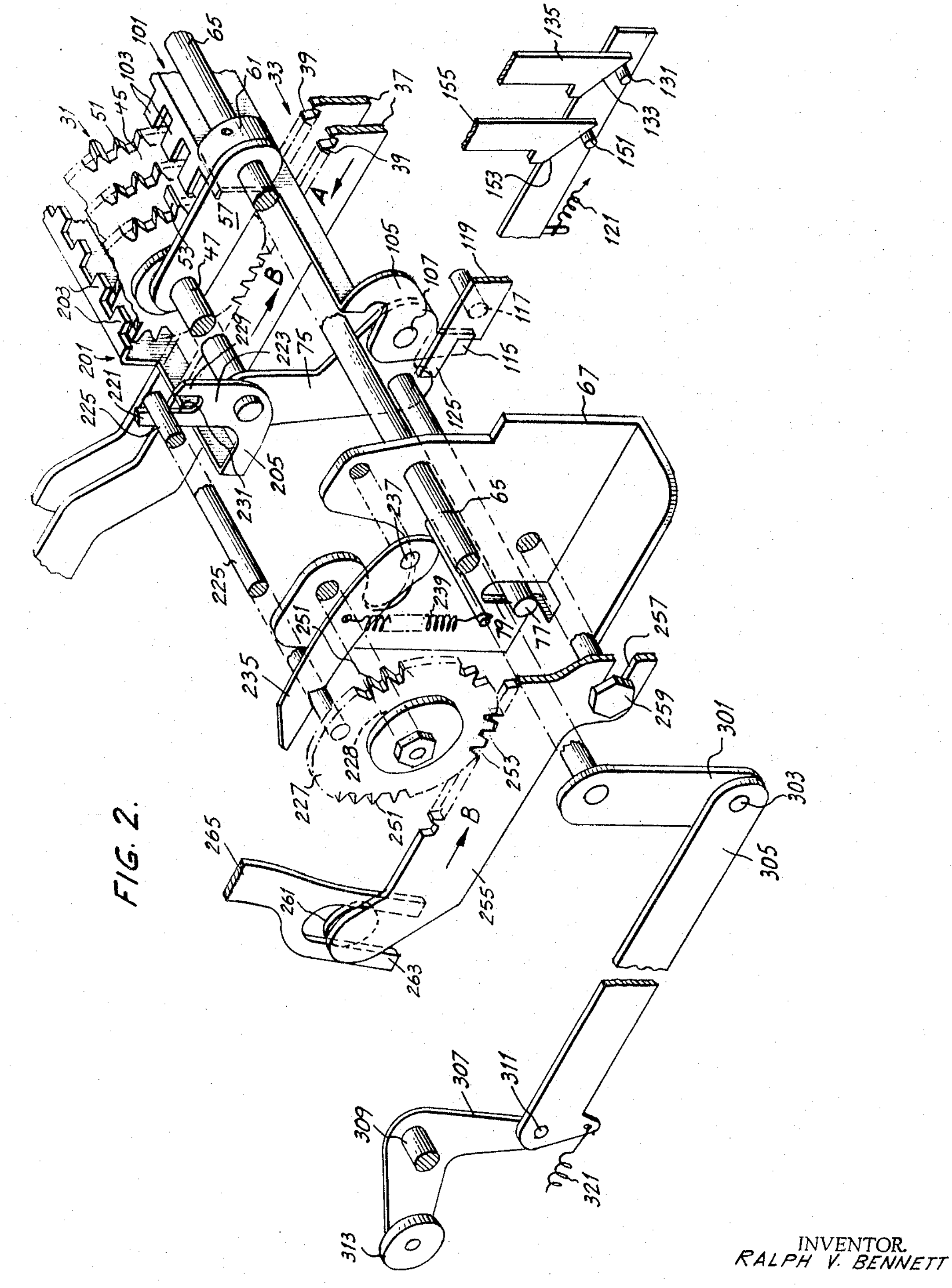
FIG. 2 is an exploded perspective view of a portion of the mechanism shown in FIG. 1.
Figure 8:
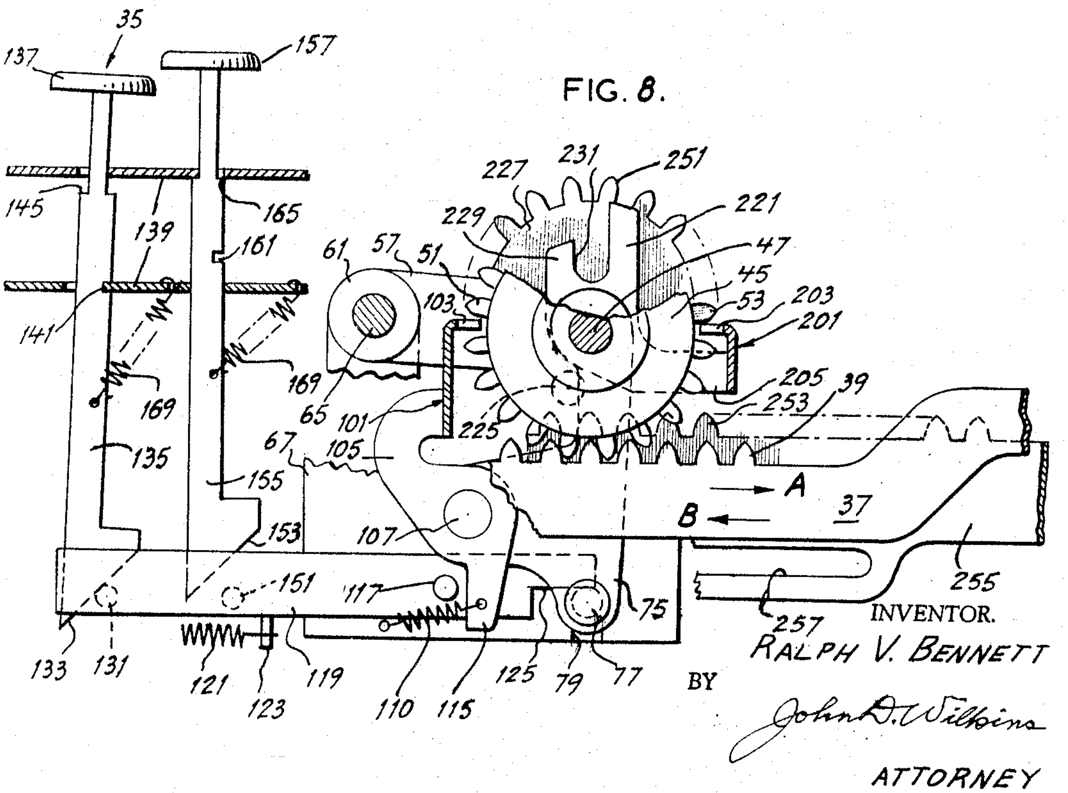
FIG. 8 is a view similar to FIG. 4 partially cut away to better show the details thereof and showing the mechanism thereof set for a stored condition.

With reference to FIGS. 1 and 2, 31 generally designates a memory unit disposed for selective movement into and out of engagement with a differential mechanism 33 of a calculator and selectively controlled for such movement by a key set control unit 35 (FIGS. 1 and 8).

Differential mechanism 33 includes a plurality of racks 37 (usually one for each ordinal position of the calculator) disposed for movement in a value receiving or forward direction (in the direction of arrow A in FIG. 2), and in a value entering or return direction (in the direction of arrow B in FIG. 2). An appropriate number of gear teeth 39 are formed on racks 37. Suitable conventional drive mechanism (not shown) is provided to effect the hereinbefore mentioned movements of rack mechanism 33.

Figure 3:
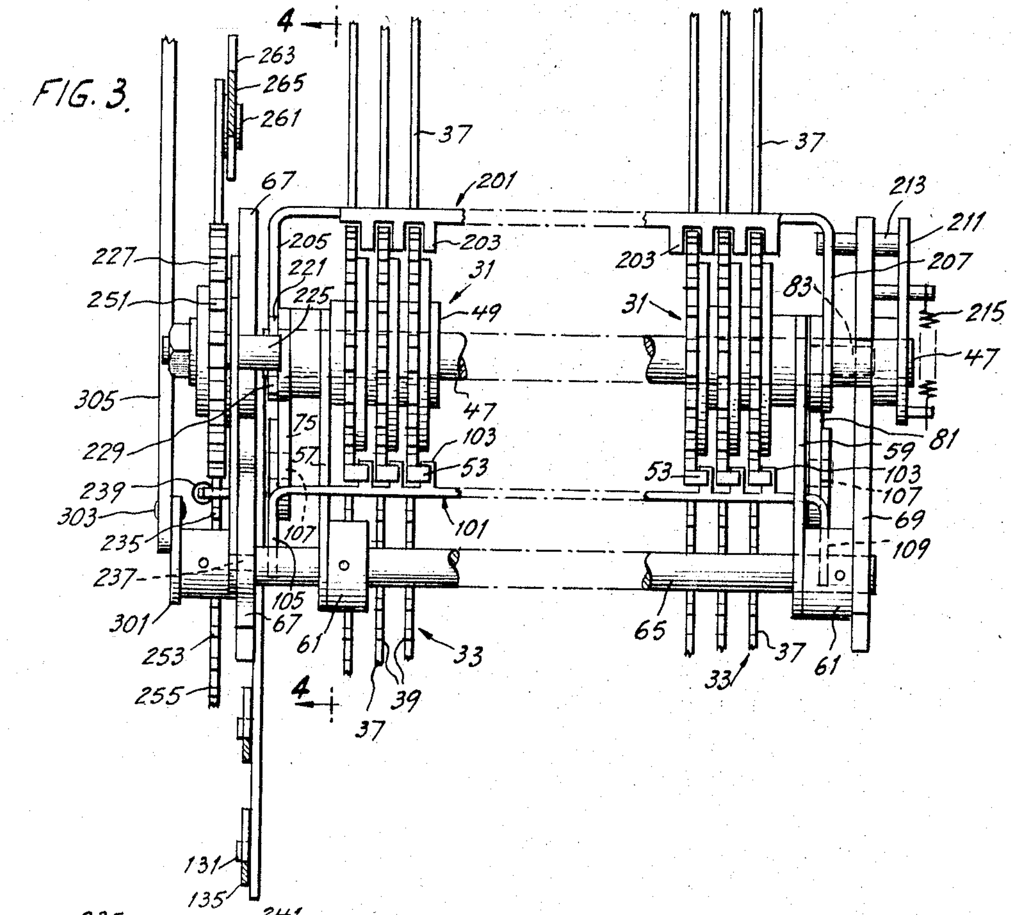
FIG. 3 is a sectional view taken on line 3—3 of FIG. 1.

A plurality of gear type wheels 45 (FIGS. 2 and 3), freely mounted on a memory unit shaft 47 for rotation with respect thereto and spaced one from the other by a plurality of spacers 49 (FIG. 3), constitute the value receiving and storing elements for memory unit 31; there being as many wheels 45 as desired and preferably one for each rack 37. An appropriate number of teeth 51 (FIGS. 1 and 2) are formed on each memory wheel 45 depending upon the notation used in the calculator. In this particular instance, there are twenty teeth 51 for each wheel 45 with one tooth having a lug 53 extending therefrom to the right and into the space between the teeth 51 and the adjacent wheel 45. An arm 57 (FIGS. 1, 2 and 3) and an arm 59 (FIG. 3) support memory unit shaft 47 and are in turn fixedly secured, as by collars 61 (FIGS. 2 and 3) and 63 (FIG. 3) to a cross-shaft 65 (FIGS. 1, 2 and 3) rotatably journalled in a left frame plate 67 (FIGS. 2 and 3) and a right frame plate 69 (FIG. 3). A left end plate 75 (FIGS. 2 and 3) depends from shaft 47 near the left end thereof, and carries a stud 77 which extends therefrom into a slot 79 (FIG. 2) formed in left frame plate 67. A right end plate 81 (FIG. 3) depends from shaft 47 near the right end thereof and carries a stud 83 which extends therefrom into a slot, similar to slot 79, formed in right frame plate 69. Studs 77 and 83 coacting with the sides of their respective slots, guide the wheels 45 during movement thereof into and out of tooth meshing engagement with racks 37 below.

A zero stop comb 101 (FIGS. 1, 2 and 3) has a plurality of teeth 103 (FIG. 2) each disposed between adjacent memory wheels 45, and provided at its left end with an extension terminating in a bracket 105 pivotally mounted as at pivot 107 (FIG. 2) to left end plate 75 and at its right end (FIG. 3) with a bracket 109 mounted to right end plate 81 at a pivot similar to 107.

Figure 4:
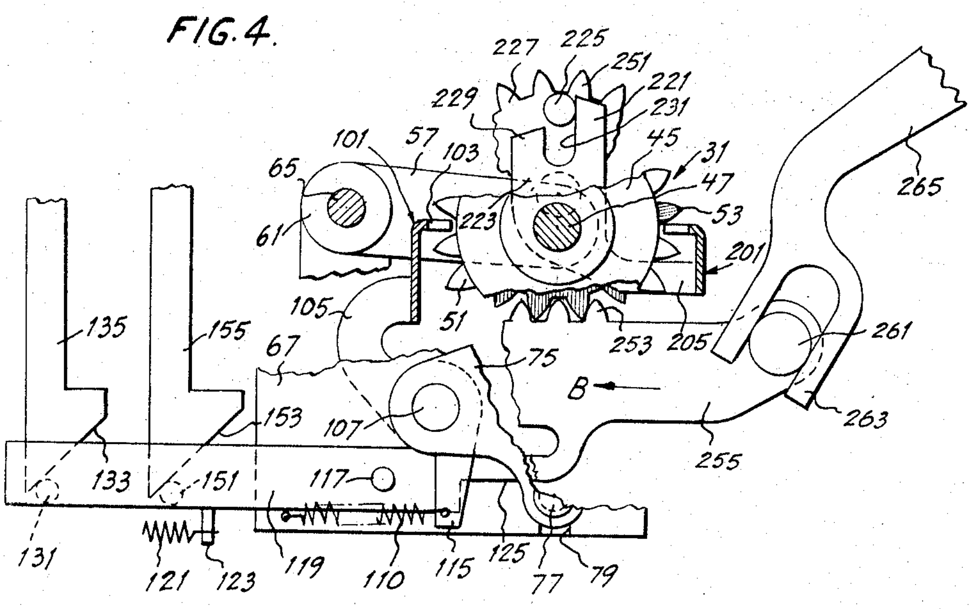
FIG. 4 is a sectional view taken on line 4—4 of FIG. 3 with some parts removed to better show the restoring rack and the memory unit in the quiescent conditions thereof.

Tail 115 (FIGS. 2, 4 and 9) formed on bracket 105 depends into the path of a stud 117 carried by a control slide 119. Bias 110 (FIG. 4), a tension spring, urges teeth 103 for arresting lugs 53 in the zero condition. A spring 121 (FIG. 4), having one end secured to a projection 123 formed on slide 119 and the other secured to a frame (not shown), urges slide 119 to the left (FIG. 8).

A recall stud 131 (FIGS. 1 and 8) on slide 119 is engageable with a short motion wedge cam 133 on a stem 135 of a recall key 137, guided for up and down movement in a keyboard mount 139.

A lock notch 141 in stem 135 coacts with lower keyboard plate 143, and a shoulder 145 is formed on stem 135 under upper keyboard plate 147. A spring 149, having one end secured to stem 135 and the other end to plate 143, urges either shoulder 145 to engage with plate 147 (FIG. 1) in the raised position of recall key 137, or notch 141 to engage with plate 143 (FIG. 8) in the depressed position of key 137.

A storage stud 151 (FIGS. 1 and 9) disposed on slide 119 is also urged by spring 121 to engage with long motion cam 153 formed on a stem 155 of a storage key 157 guided for vertical up and down movement in keyboard mount 139. A lock notch 161 is formed in stem 155 for coaction with lower plate 143 and a shoulder 165 is formed on stem 155 near upper plate 147. A spring 169, having one end thereof secured to stem 155 and the other end thereof secured to lower plate 143, urges either shoulder 165 into engagement with upper plate 147 (FIG. 1) for the raised position of storage key 157, or notch 161 into engagement with lower plate 143 (FIG. 9) for the depressed position of the storage key.

Figure 6:
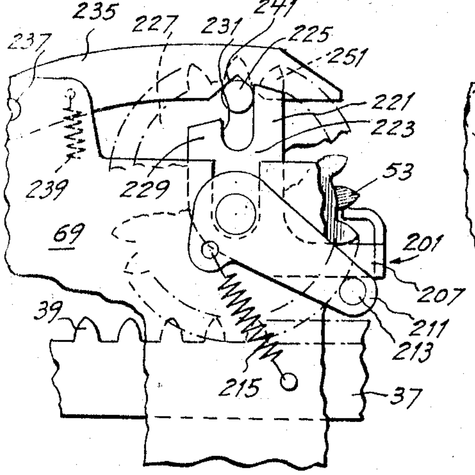
FIG. 6 is a right hand elevational view of a portion of the mechanism shown in FIG. 3.
Figure 7:
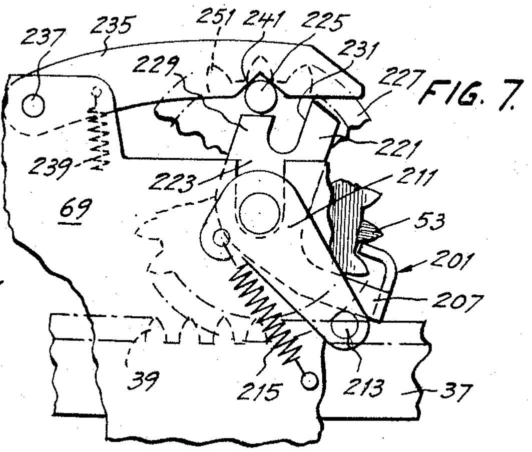
FIG. 7 is a view similar to FIG. 6 showing the elements thereof in the overthrow position.

A restoring comb 201 (FIGS. 2 and 3), formed with a plurality of teeth 203 disposed respectively in the spaces between memory wheels 45 and adapted for coaction with lugs 53 thereof, has formed near the left end thereof an arm 205 rotatably carried by memory unit shaft 47, and near the right end thereof an arm 207 (FIGS. 3 and 6) also rotatably carried by memory unit shaft 47. A lever 211 (FIGS. 3 and 6) also rotatably carried by memory unit shaft 47 is formed with a stud 213 extending below arm 207 of restoring comb 201. A spring 215, having one end thereof secured to lever 211 and the other end thereof secured to frame plate 69, urges lever 211, arm 207, and restoring comb 201 in the counterclockwise direction (FIG. 6) about memory unit shaft 47 until a long finger 221 (FIGS. 2 and 6) formed on an upward extension 223 of arm 205 engages a stud 225 carried by a restoring wheel 227. A short finger 229 is also formed on extension 223 of arm 205 in spaced relationship with long finger 221 thereof to define therebetween a slot 231 adapted to receive stud 225. A detent latch 235, rockably mounted on a pivot 237, is urged (in the clockwise direction FIG. 6; counterclockwise in FIG. 1) by a spring 239 to receive and seat stud 225 of restoring wheel 227 in latch notch 241 to detent the wheel in its rest position (FIG. 6).

Teeth 251 (FIGS. 2 and 4) formed on restoring wheel 227, are always disposed in mesh with teeth 253 of a restoring rack 255 having formed therein a guide slot 257 (FIG. 2) adapted to receive one or more guide studs 259 secured to frame plate 67. A stud 261 (FIGS. 1, 2 and 4) carried by restoring rack 255 is received in a forked end 263 of a restoring arm 265 rotatably carried by a shaft 267 (FIG. 1) fixed between the frames of the calculator and having formed in a drive portion 269 thereof a slot 271 adapted to receive a drive shaft 273 which also forms part of the conventional rack drive mechanism of the calculator.

An arm 301 (FIGS. 2 and 3) fixedly secured at its upper end to the left end of cross shaft 65 is pivotally connected at its lower end by a pivot 303 (FIGS. 1 and 2) to a slide 305. A bell crank 307 (FIG. 1), rotatably carried by a pivot stud 309 secured to a frame (not shown) of the calculator has one arm thereof interconnected to slide 305 by a pivot pin 311 and carries on its other arm a follower roller 313 disposed for coaction with a cam 315 secured to a drive shaft 317 which is entrained with the main drive system of the calculator. A spring 321 having one end thereof secured to a frame (not shown) of the calculator and the other end thereof secured to slide 305 urges slide 305 to the left (FIGS. 1 and 2) and through pivot pin 311 urges bell crank 307 in the clockwise direction about pivot stud 309 to maintain the surface of follower roller 313 in engagement with the surface of cam 315.

A substantially conventional operator actuated, or machine actuated, mechanism (not shown) is provided to set in motion a main drive system (not shown), during which cam 315 is appropriately driven by drive shaft 317, which when so actuated operates through what is commonly known as a cycle of operation during which differential mechansm 33 and restoring rack 255 are first moved in a value receiving or forward direction (in the direction of arrow A in FIG. 2) and are then moved in a value entering or return direction (in the direction of arrow B in FIG. 2).

With the calculator set for neither recall nor storage and prior to the initiation of a cycle of operation thereof the elements are as shown in FIGS. 1, 2, 4 and 6. Recall key 137 and storage key 157 are in their raised positions. Control slide 119 is in its rightmost position (FIG. 1) so that shoulder 125 thereof is out of the path of movement of stud 77 (FIG. 4) carried by arm 75 of memory unit 31. Restoring rack 255 is also in its rightmost position (FIG. 1) having been moved there at the termination of the previous cycle of operation by restoring arm 265 and drive shaft 273 incident to the normal restoring operation for racks 37, which are also at their rightmost positions (FIG. 1). Cam 315 is as shown in FIG. 13 the surface thereof coacting with roller 313 of bellcrank 307 to maintain slide 305 in its rightmost position against the action of spring 321 to thus maintain arms 57 and 59 of memory unit 31 and memory unit shaft 47 in their lowered positions with teeth 51 of memory wheels 45 in engagement with teeth 39 of racks 37.

Initiation of a normal cycle of operation of the calculator (with neither recall key 137 nor storage key 157 depressed) results in a clockwise rotation of shaft 317 and cam 315 from the position shown in FIG. 1 so that spring 321 rocks bellcrank 307 in the clockwise direction about pivot stud 309 while keeping follower roller 313 in engagement with the low surface of cam 315 and in doing so moves control slide 305 to the left or forward direction A. Arms 301, 57 and 59 are rocked in the clockwise direction about cross shaft 65 (FIGS. 1 and 2) to raise the memory unit shaft 47 to the position shown in FIG. 5 more nearly coaxially aligned with wheel 227. This moves teeth 51 of memory wheels 45 out of engagement with teeth 39 of racks 37 and moves short finger 229 of extension 223 of arm 205 up into the path of rotation of restoring wheel stud 225, thereby received in slot 231.

Figure 5:
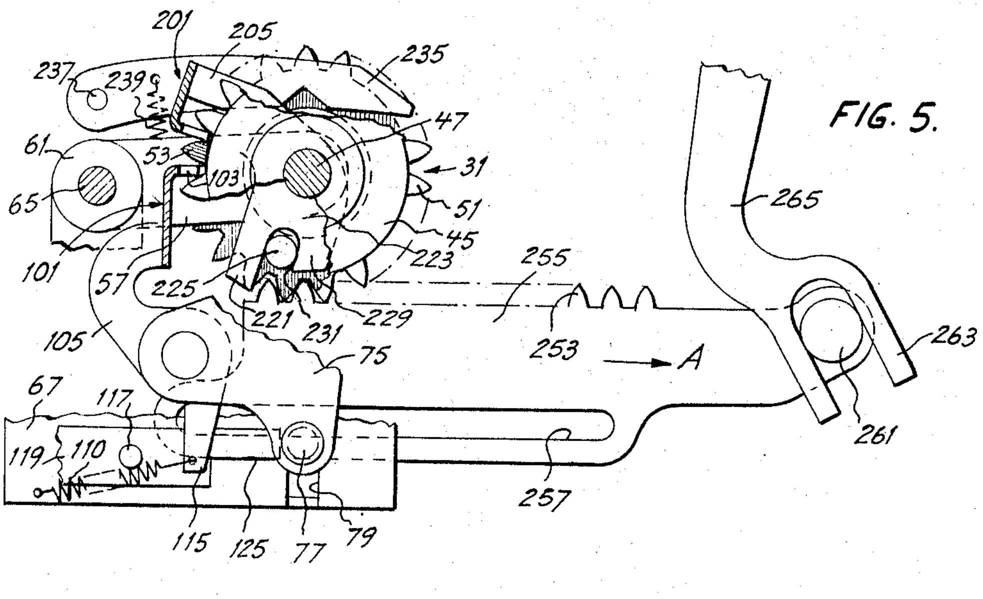
FIG. 5 is a view similar to FIG. 4 but showing the mechanisms in the restored condition thereof.

Drive shaft 273, moving in conjunction with the drive mechanism for differential mechanism 33 rocks restoring arm 265 in the clockwise direction about shaft 267 (FIG. 1), whereupon forked end 263 thereof acts on stud 261 of restoring rack 255 to move restoring rack 255 in the direction A to the position shown in FIG. 5. Teeth 253 of the translating restoring rack 255 transmit the motion thereof to teeth 251 of restoring wheel 227 to drive same and stud 225 carried thereby in the counterclockwise direction (FIG. 5) about its axle 228, fixed in plate 67, and since stud 225 is in slot 231 between long finger 221 and short finger 229 of extension 223, to drive, through extension 223, the restoring comb 201 in the counterclockwise direction from the position shown in FIG. 4 about memory unit shaft 47. Any lugs 53 of memory wheels 45 which lie in the path of movement of teeth 203 of restoring comb 201 will therefore be engaged by their respective teeth (203) and the associated memory wheels 45 will be returned to their zero positions (FIG. 5).

At this point in the cycle cam 315 acts on follower roller 313 to rock bellcrank 307 in the counterclockwise direction about pivot stud 309 (FIG. 1) moving slide 305 in the return direction of arrow B (FIGS. 1 and 2) against the action spring 321 pivoting arms 301, 57 and 59 in the counterclockwise direction (FIG. 1) about cross shaft 65 and lowering memory unit shaft 47 to thus re-engage teeth 51 of memory wheels 45 with teeth 39 of racks 37. The cycle of operation for the calculator continues with drive shaft 273 (moving in conjunction with the restoring mechanism for differential mechanism 33) acting on restoring arm 265 to return restoring rack 255 in the direction B (FIGS. 1, 2 and 4) driving restoring wheel 227, stud 225 thereof, extension 223, arm 205, and restoring comb 201 in the clockwise direction from the position shown in FIG. 5 to their quiescent positions (FIGS. 1 and 4) until relatched by action of spring 239 seating notch 241 of detent latch 235 on stud 225.

It is during this restoring movement, when racks 37 and 255 are driven in direction B, that the values last listed into racks 37 are entered into memory wheels 45.

In this condition of operation, each last listed value replaces each previously listed value, which is erased during each cycle of operation during the forward stroke when the racks 37 are not in mesh with wheels 45 and are allowed to escape while the restoring comb produces a clearing or zeroizing action on the memory wheels erasing whatever value had been previously entered into these wheels.

Thus, without any action on the part of the operator, the memory unit 31 automatically stores each last listed value for one cycle, i.e. for single cycle recall.

RECALL OPERATION

To recall for use the last listed or totalled value so entered in memory unit 31, the operator need only depress recall key 137 (FIG. 1) moving shoulder 145 thereof away from upper plate 147 of keyboard 139 and moving notch 141 thereof into position to permit spring 149 to latch same onto lower plate 143 (FIG. 8).

Cam portion 133 of recall key 137 acting on stud 131 of control slide 119 moves control slide 119 in the direction of arrow A (FIG. 8) against the action of spring 121. This places shoulder 125 of control slide 119 over stud 77 of memory unit 31 (FIG. 8).

Upon initiation of a cycle of operation of the calculator and subsequent movement of cam 315 by shaft 317, spring 321 again attempts to rock bellcrank 307 in the clockwise direction (FIG. 1) about pivot stud 309 and to move slide 305 in the direction to raise memory unit wheels 45 and move teeth 51 thereof out of engagement with teeth 39 of racks 37. The presence of control slide shoulder 125 overlying stud 77 of memory unit 31, however, prevents such spring actuated movement and disengagement; teeth 51 of memory wheels 45 are thus constrained to remain in engagement with teeth 39 of racks 37 during both the forward movement and the restoring movement.

Since in this lowered or rack-engaging position, short finger 229 does not reach up into the path of restoring stud 225, there is no driving engagement between stud 225 and finger 229. Thus comb 201 is left unmoved.

The forward movement for the racks 37 is thus controlled solely by the setting of lugs 53, indicative of the last listed or totalled value, and by the limiting of lugs 53 of the various memory wheels 45 against teeth 103 of zero stop comb 101. During the restoring movement of differential mechanism racks 37 (in the direction B) the value is again repeated by being re-entered into memory unit wheels 45 for subsequent use as the next listed amount, so long as the recall key remains depressed.

To again set the calculator for normal operation, the operator need only move recall key 137 to the left (FIG. 8) to release notch 141 thereof from engagement with shelf 143 of keyboard 139 and permit spring 149 to raise recall key 137 until shoulder 145 thereof engages upper wall 147 of keyboard 139. During such movement of key 137, cam portion 133 thereof also moves upward (FIG. 8) permitting spring 121 to move control slide 119 in the direction of arrow B removing shoulder 125 of slide 119 from its position in the path of movement of stud 77 of memory unit 31 to thus permit normal single cycle operation of the memory unit.

STORAGE OPERATION

Figure 9:
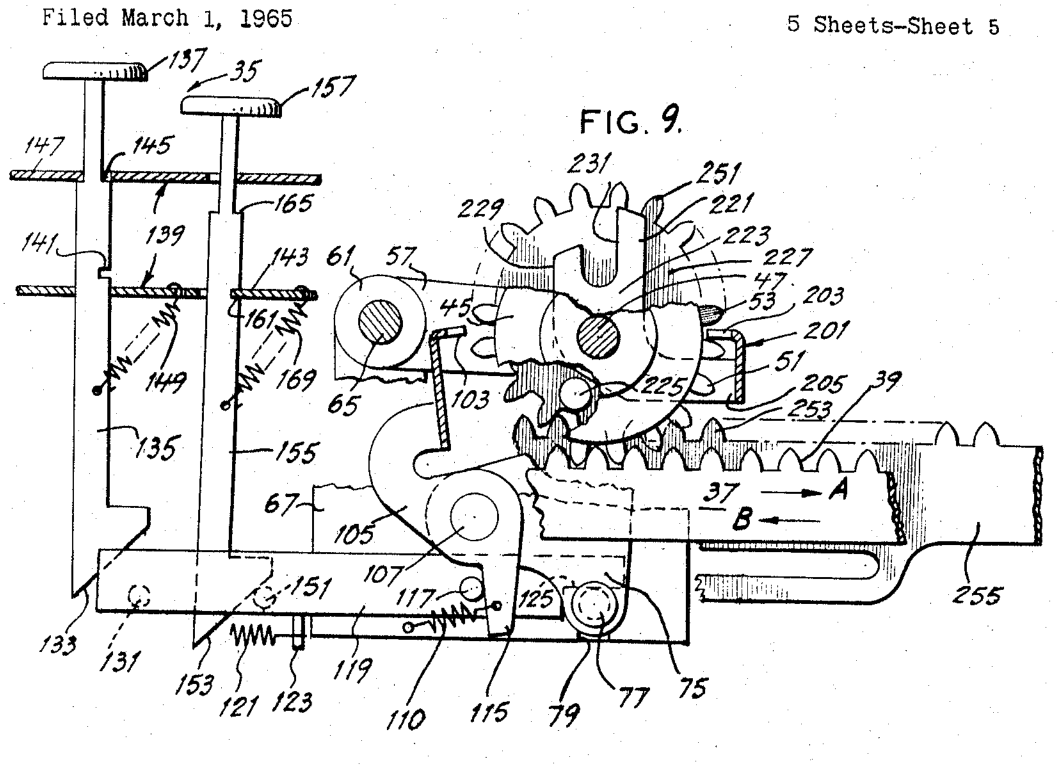
FIG. 9 is a view similar to FIG. 4 showing the mechanism thereof set for a stored condition.

For long term storage of a last printed value in memory wheels 45 for use in any subsequent operation, the operator, first of all, need only depress storage key 157 moving same against the action of spring 169 until notch 161 thereof is engaged with shelf 141 of keyboard 139 (FIG. 9).

Cam portion 153 of storage key 157 acting on stud 151 of slide 119 in the direction of arrow A (FIG. 9) and against the action of spring 121 moves shoulder 125 of slide 119 over stud 77 of memory unit 31 to constrain same in the position thereof engaged with the racks of the differential mechanism 33.

In addition, this moves stud 117 on slide 119 far enough to press against tail 115 of bracket 105 of memory unit 31. Such latter action effects a counterclockwise rocking (FIG. 9) of arm 105 about pivot 107 moving teeth 103 of zero stop comb 101 out of the path of movement of lugs 53 of memory unit wheels 45. Introduction of any number of values into the calculator can now be accomplished as hereinbefore explained, however, such values will not be entered into memory wheels 45 as is usually accomplished during a normal machine operation (storage key undepressed) and the stored selected value will not be disturbed by entry of other values even though teeth 51 of memory wheels 45 remain engaged with teeth 39 of racks 37 while such values are so introduced.

During the subsequent forward movement of racks 37 (in the direction A) any subsequent value so entered into the calculator will be added to the value stored in memory unit 31 (it being understood that there are no tens transfers) and memory wheels 45 will be rotated in the clockwise direction angles corresponding to these values (FIGS. 1 and 2). The absence of interference from teeth 103 of zero stop comb 101 in this operation permits such unrestricted movement of lugs 53 past the zero position, if required. Upon return movement of racks 37 the same value so added will be subtracted and wheels 45 will again be returned to the position wherein the selected value is the only value in storage.

As during recall, the restoring wheel 227 oscillates ineffectively because short finger 229 of extension 223 is kept below stud 225.

To recall the last printed value that has been so stored, the operator need next move storage key 157 so as to free notch 161 thereof from shelf 143 and permit spring 169 thereof to raise same to its undepressed condition. Thirdly, unless the recall key is already depressed, the operator then proceeds to initiate a recall cycle by depressing recall key 137 and then a function key such as an add key. The storage and recall keys may be depressed at the same time, or the storage key after the recall key. If the recall key is already depressed, raising the storage key is enough to condition the machine for recall. In either event, movement of differential racks 37 upon initiation of the next cycle of machine operation is controlled by value so stored.

If it is desired to permit erasure of the value now stored in memory unit wheels 45, the operator need only continue with the normal operation of the calculator by moving recall key 137 to its undepressed position. If on the other hand it is desired to again store the value, the operator need only again depress storage key 157.

Equivalents of such controlling elements may be obviously substituted therefor. In addition, if desired, recall key 137 may be disposed in keyboard 139 for automatic return to an undepressed position at the end of a cycle of operation of the calculator as is commonly done for other conventional function keys.

RÉSUMÉ

There is provided for a calculator, such as an adding machine, a novel memory unit of the mechanical digit wheel type with a set of storage gears, and with associated operating and control structure for automatically retaining the last listed or totalled numerical value, i.e. the last printed figure. The unit mechanism normally stores for one cycle for single cycle recall each figure last entered but is convertible to long term storage for recall of a selected value any number of cycles after the selected value was first entered into the machine.

The unit is operable so this figure can be either:

(a) retained for the next cycle or for each of the next consecutive cycles for recall of this figure and entry again once more or consecutively one cycle at a time as often as desired as the next listed item, either positively or negatively, by operation first of a RECALL key followed by operation of a suitable function key, or this figure can be (b) retained over more than one cycle as a figure selected for long term storage, during which cycles the machine can be operated to enter other values, and then released for recall and entry of this selected figure at any subsequent time by operation first of a STORAGE key, which is followed at the subsequent time by release of the STORAGE key and then by operation of the RECALL key and a suitable function key, so that the selected figure can at this later time be entered as the next listed item.

The storage wheels 45 during the second half or return stroke of each cycle normally are disposed meshing with the calculator racks 37 which move in a first direction during entry of value therein and in a second direction or return stroke of the cycle to transmit their entered value for entry into the wheels.

By making clearing of the stored item, i.e. restoration of the storage wheels to zero, the automatic result during unmeshing of the wheels, the control is reduced to two simple mechanical actions for both recalling and storing, as determined by manual operation of two independent keys, one for storage and one for recall.

One action is that of latch 125 locking the structure for normally bringing the wheels into and out of mesh with the racks and with the restoring stud 225 so that the wheels are held in mesh even during the first half of the cycle and so that the restoring structure is made ineffective. Depression of the RECALL key prevents unmeshing and conditions the machine in the next cycle of operation to permit the meshed wheels to control movement of the racks so as to enter in them the last listed or totalled value stored in these wheels as the next listed item in the racks.

The other action is that of stud 117 pulling the zero stop 103 out of position where it is normally disposed for engagement with the zero lugs of the wheels, while at the same time again locking the wheels in mesh so that they remain meshed through the next and ensuing cycles until the STORAGE key is released for re-engaging the zero stop and allowing the storage wheels to disengage from the racks. Thus depression of the STORAGE key not only prevents unmeshing but at the same time causes the zero stops to be pulled out of the way to allow entry of other values into the differential rack mechanism for usual calculator machine operation, without disturbing the figure stored in the wheels for recall.

This is done without need for unmeshing and detenting the wheels to hold the figure in storage.

The rocking structure for engaging and disengaging the wheels normally for single cycle storage is easily coupled to existing machine rack drive and so has the advantage of simplicity together with the ability to positively put the wheels into mesh at midcycle, if not already locked in mesh, and to permit them to go out of mesh at the beginning of the cycle, unless locked.

The restoring rack 255 and gear 227 is a feature which also has the advantage of extending the use of the machine rack drive by modification to derive power from it to actuate the zeroizing comb 201 while the wheels are unmeshed to get automatic clearing of a stored item.

Normally during rack movement in the first half of a cycle, the wheels are first (a) automatically moved out of mesh and (b) positively reset to zero as the stops 103 are held in place. During completion of the first movement, but before the return stroke, the wheels normally are remeshed for value entering rotation of the wheels during the return stroke. Thus, the machine during a single cycle normally erases the previous entered value and enters a new value to be either (a) erased on the next cycle, (b) retained for single cycle recall in the next cycle, or (c) retained for long term recall at some cycle later than the next.

Motion referred to is from a rest position to the nine stop and back each cycle.

By interposing operation and release of the STORAGE key before either depressing or lifting of the RECALL key single cycle retention is converted to long term retention in a very simple way.

From the above description it will thus be seen that there has been provided a novel and improved memory unit and its controls, which, although of relatively simple construction and operation when compared to other such mechanisms, provide for automatic entry into the memory unit of each value entered into the office machine, for immediate recall in the next machine cycle of the last value so entered, or for storage of a selected value through any number of machine cycles regardless of any values entered into the machine during such cycles, and later recall of value so stored, by normally maintaining the gear wheels of said memory unit in a position of engagement with the differential rack mechanism during a whole cycle and by permitting movement of said memory unit gear wheels from said engaged position only at the beginning of a cycle when a new value is to be entered into said memory unit.

The embodiment described hereinbefore may be changed by those skilled in the art. For example, instead of using the forked extension 223 of the restoring comb arm, the driving stud 225, stud bearing wheel 227, rack 255 and rocking lever 265 connected to the driving means for zeroizing restoration, the restoring means, including comb 201, may be driven by spring 215 changed to act on lugs 53 over enough of an arc of comb oscillation on shaft 47 to alone put the wheels yieldably in zero condition. With this modification, restoring comb 201 would always act on one or more lugs of the memory wheels. Instead of a single slide 119 with shoulder 125, there may be two such slides, one for each of keys 137 and 157, particularly if these are to be disposed on opposite sides of the machine. Instead of two depressible keys 137 and 157, there may be a single slide operating knob moving a lever one end of which is connected to such a knob and the other to a slide like 119 so that the knob and slide may be moved either (1) to an intermediate recall position and back, or (2) through that position to the extremity of a storage position (where shoulder 125 and stud 117 effectuate latching and lockout of the zero stops), left there for a time, eventually partially back for recall, and then all the way back after recalling is done. These and other modifications and embodiments may be made without departing from the spirit and scope of this invention as set forth in the appended claims.

What is claimed is:

1. In a cyclicly operable business machine, a value storage and recall mechanism comprising:

(a) a differentially settable memory unit;

(b) a differential transfer mechanism;

(c) means for moving said transfer mechanism to a set position corresponding to a value during the first half of a cycle of operation of said machine;

(d) erasing means for actuating said memory unit to its zero condition during the first half of said cycle of operation;

(e) means for shifting said memory unit into engagement with said transfer mechanism at the end of said first half cycle whereby said value is transferred to said memory unit during the second half of said cycle; and (f) means for temporarily disabling said erasing means thus to retain the value set in said memory unit for use during subsequent cycle of machine operation; and (g) control means selectively operable to latch said memory unit and transfer mechanism releasably in engagement with each other while said erasing means is disabled thus to retain the value last entered into said memory unit for recall when desired.

2. A cyclicly operable business machine according to claim 1 wherein:

(a) the differentially settable memory unit comprises a plurality of pinion gear storage wheels having a zero stop means thereon;

(b) said differential transfer mechanism comprises a plurality of toothed racks; and (c) said erasing means comprising means for rotating said storage wheels from their value representing position and a movable stop member normally positioned in the path of movement of said zero stop means on said storage wheels.

3. A cyclicly operable business machine according to claim 2 wherein:

(a) said means for temporarily disabling said erasing means comprises a key, and linkage means operable by said key for moving said movable stop member from the path of rotation of said zero stop means on said storage wheels.

4. A cyclicly operable business machine according to claim 3 wherein:

(a) said control means selectively operable to latch said memory unit and transfer mechanism releasable in engagement with each other comprises a depressible key, linkage means operable by said key means, and means for releasably locking said key in its depressed position.

References Cited by the Examiner

UNITED STATES PATENTS

| | | | |
|---|---|---|---|
| 2,821,342 | 1/1958 | Capellaro | 235—60 |
| 2,835,441 | 5/1958 | Pitman | 235—60 |
| 3,026,030 | 3/1962 | Gelling | 235—60 |
| 3,260,449 | 7/1966 | Gassino | 235—60.25 |

RICHARD B. WILKINSON, *Primary Examiner.*

L. R. FRANKLIN, *Examiner.*